Jan. 13, 1931.  A. E. AXLUND  1,788,939
SYSTEM OF INSTALLING INSULATED PIPE AND ARMORED INSULATION THEREFOR
Filed Nov. 22, 1928
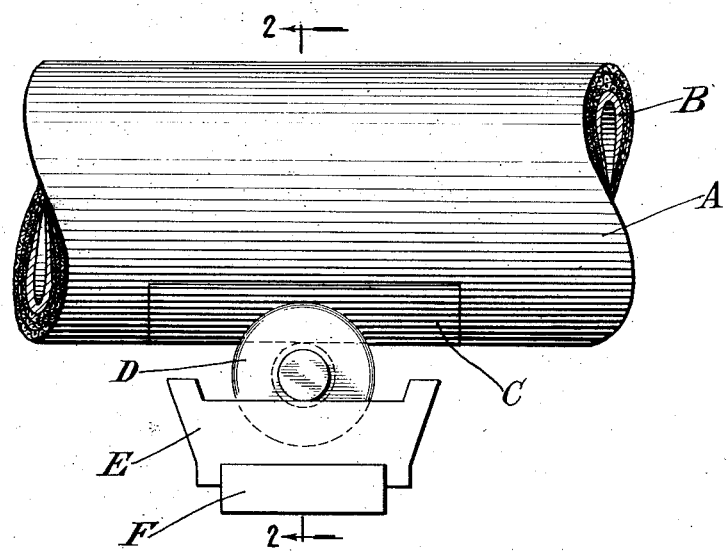
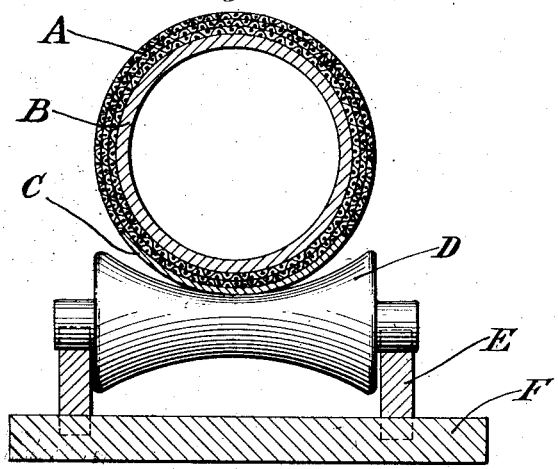

Patented Jan. 13, 1931

1,788,939

UNITED STATES PATENT OFFICE

ANDREW EMANUEL AXLUND, OF VALLEJO, CALIFORNIA

SYSTEM OF INSTALLING INSULATED PIPE AND ARMORED INSULATION THEREFOR

Application filed November 22, 1928. Serial No. 321,259.

My invention relates to system of installing insulated pipe and armored insulation for use in connection therewith. It is particularly addressed to the installing of pipes with insulation thereon and means for protecting the insulation from damage resulting from vibration or movement of the pipe line independent of the hanger or support carrying the pipe line.

By my invention I provide an insulation for pipe lines to which is attached or in which is embedded a protecting or armored plate that is fixed against movement independent of the insulation so that the protecting or armored plate receives the wear due to the movement of the pipe carrying the insulation independent of the movement of the hanger or support.

In the drawings in which like letters refer to like parts, Fig. 1 is a side view of my invention and Fig. 2 is a cross section on the line 2, 2 of Fig. 1.

In the drawings, B is a pipe that is covered with heat insulation A of any character although I have shown a laminated air cell covering. The pipe with the covering on it is supported on a roller D mounted so as to freely rotate on cradles E supported by the hanger member F on opposite sides of the pipe so as to carry the roller D. I provide an armored plate or protecting member C, preferably of metal, which is embedded in or fixedly attached to the insulation A so as not to permit movement of the armored plate C independent of the insulation A. This armored plate C is, as shown, embedded in the insulation A by cutting away a portion of the insulation on the lower side of the pipe line. The armored plate C, the outer surface of which is of the same curvature as the outer surface of the insulation A, serves to support the pipe and the insulation on the roller D, permitting the pipe with the insulation on it to move independent of the hanger F and independent of the roller D, thereby allowing for movement due to expansion or contraction, vibration or other cause without wear of, or damage to, the insulation A. If desired any suitable hard wear resisting material could be used for the protecting member C.

Claims:

1. An insulated pipe system comprising a pipe, insulating covering on said pipe, a support for said pipe and said covering permitting movement of the pipe and covering independent of the support, protecting means for said covering arranged between the covering and the support and independent of and not contacting with said pipe, so that said covering cannot move independent of said protecting means.

2. An insulated pipe system comprising a pipe, insulating covering on said pipe, a support for said pipe and said covering permitting movement of the pipe and covering independent of the support, protecting means for said covering arranged between the covering and the support, said protecting means being partially embedded in said covering and independent of and not contacting with said pipe.

3. An insulated pipe system comprising a pipe, insulating covering on said pipe, a support for said pipe and said covering permitting movement of the pipe and covering independent of the support, protecting means for said covering arranged between the covering and the support and independent of and not contacting with said pipe, said protecting means being partially embedded in said covering so that the outer face of the protecting plate will register with the outer face of the covering adjacent thereto.

4. An insulated pipe system comprising a pipe, insulating covering on said pipe, a support for said pipe and said covering permitting movement of the pipe and covering independent of the support, protecting means for said covering arranged between the covering and the support so that said covering cannot move independent of said protecting means, said covering entirely separating said pipe and said protection means and being thinner between the pipe and the protecting means than the adjacent portions of covering.

5. An insulated pipe system comprising a pipe, a laminated heat insulation surrounding said pipe, a support for said pipe, a protective plate for a portion of said insulation, said plate being partially embedded in said insulation and being independent of and not contacting with said pipe.

6. Heat insulation means comprising a cylinder of heat insulation material, a plate of hard protecting material embedded in a portion of the outer surface only of the insulating material, said plate being arranged so that it will be independent of and not contact with a structure to which the insulation is applied for insulating purposes.

7. Heat insulation means comprising a cylinder of laminated heat insulation material, a plate of hard protecting material embedded in a portion of the outer surface only of the insulating material, said plate being arranged so that it will be independent of and not contact with a structure to which the insulation is applied for insulating purposes.

In testimony whereof, I have signed my name to this specification.

ANDREW EMANUEL AXLUND.